July 24, 1962
E. A. HUNTER ETAL
3,046,244
METHOD OF PREPARING A SOLUTION OF BUTYL RUBBER IN HEXANE
COMPRISING ADDING WET BUTYL RUBBER TO AN
AGGITATED MIXTURE OF HEXANE AND WATER
Filed April 18, 1956
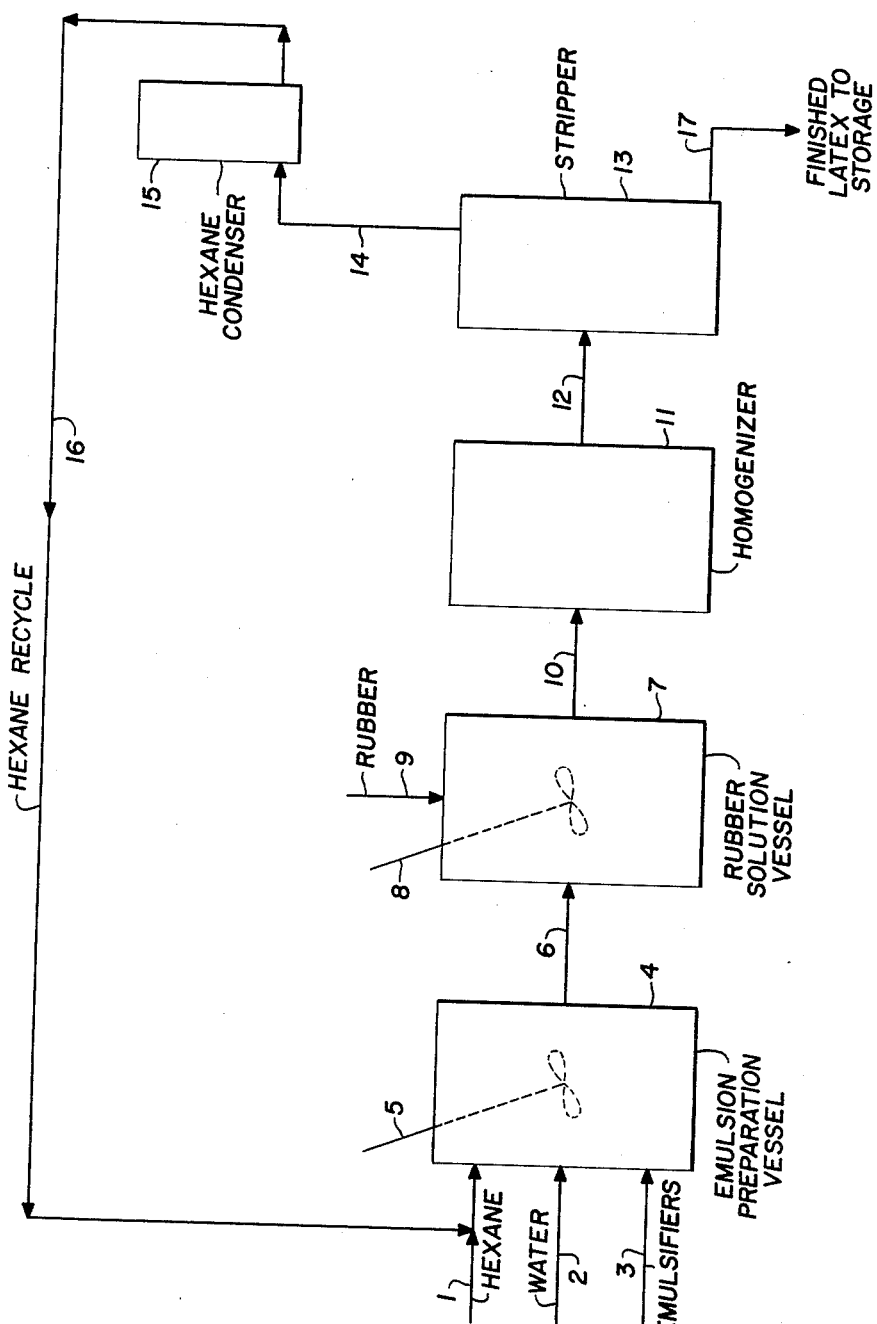
Edward A. Hunter
Merlan M. Lambert
Marnell A. Segura
Augustus B. Small
Inventors
By C. D. Storrs
Attorney 3,046,244
METHOD OF PREPARING A SOLUTION OF BUTYL RUBBER IN HEXANE COMPRISING ADDING WET BUTYL RUBBER TO AN AGITATED MIXTURE OF HEXANE AND WATER
Edward Allen Hunter and Merian Meredith Lambert, Baton Rouge, La., Marnell Albin Segura, Elizabeth, N.J., and Augustus Bailey Small, Baton Rouge, La., assignors to Esso Research and Engineering Company, a corporation of Delaware
Filed Apr. 18, 1956, Ser. No. 578,965
4 Claims. (Cl. 260—29.7)

This invention relates to a method for preparing solutions of natural and synthetic polymers and resins and to the preparation of latices therefrom.

It is well known that polymers may be dissolved in suitable solvents simply by adding the polymer to the solvent, preferably in the form of discrete particles, while stirring and even heating to facilitate solution. However, particularly in the case of very high molecular weight polymers, such as natural rubber or synthetic rubber, the resulting solution is exceedingly viscous and tacky. This renders the polymer solution difficult to handle and slows the rate at which the polymer goes into solution. When such solutions are to be used in large volumes for the production of other products, such as polymer latices, the viscosity problem assumes large proportions and is therefore economically disadvantageous.

Another difficulty which is inherent in the usual technique is the requirement that the polymer be thoroughly dry since the presence of even a small amount of water introduces an immiscible phase to the system, increasing the viscosity of the resulting solution to an undesirable and almost unmanageable degree. Thus in order to bring the viscosity within a manageable range the amount of polymer introduced into the solution must be greatly reduced, making the process economically unattractive, particularly when it is desired to convert the solution to a latex.

This problem is particularly critical with respect to those polymers which occur or are prepared as dispersions in water, such as natural rubber and the synthetic polymers, butyl rubber copolymer of isobutylene and small amounts of diolefins as defined in Hackh's Chemical Dictionary, third edition, the copolymers of isobutylene and styrene, and polyisobutylene. The dispersions of the synthetic polymers are formed by dumping the reactor effluent into hot water containing a dispersing agent, such as zinc stearate, to volatilize the diluents and unreacted monomers and form a coarse dispersion. This dispersion is not stable since it is too coarse. The polymer must be removed from the water and dried in the form of crumb before being dissolved in a hydrocarbon solvent, if the difficulties of excessive viscosity are to be avoided. However, any method of drying which removes all the water from the polymer causes the polymer to break down in molecular weight, making it impossible to prepare solutions or latices from polymer of maximum molecular weight produced in the plant.

It is therefore the major object of this invention to provide a method of preparing polymer solutions in which the disadvantages inherent in the usual technique are avoided.

It is a further object of this invention to avoid the problem of high viscosity in the preparation of polymer solutions.

It is a still further object of this invention to provide a process for the preparation of polymer latices directly from solid polymer without the intermediate use of viscous polymer solutions.

Another object of this invention is to provide a method for preparing latices from the very highest molecular weight polymers.

A further important object of this invention is to prepare latices directly from polymer in the form of wet crumb without the attendant viscosity difficulties.

Another important object of the invention is to provide a method for simultaneously dissolving a solid polymer in a suitable solvent and dispersing it in water.

Further objects and advantages of the invention will be apparent from the following description taken in connection with the accompanying drawing and appended claims.

The above objects are achieved in accordance with the present invention by adding solid polymer particles to an emulsified mixture of a solvent and water. It is not necessary that a stable emulsion be formed and for that reason emulsifying agents are not required. It is only necessary that the solvent be dispersed in the water while the polymer is being added. This can be accomplished simply by the use of violent agitation which should be continued until the polymer is dissolved. Alternatively the solvent, water and discrete particles of polymer may be mixed and pumped through a length of pipe under conditions of turbulent flow, such as, for example, that obtained by means of a series of orifice mixers. Regardless of the method by which the agitation is accomplished heat may be employed to increase the rate of solution. The polymer goes into solution smoothly without excesive increase in viscosity, forming a solution of polymer in the solvent which in turn is dispersed in water as the continuous phase. The polymer may be employed in the form of wet crumb (containing up to 50% water) in which case it may be desirable to add additional solvent to compensate for the water added by the wet crumb.

If emulsifying agents are used in preparing the solvent-water emulsion, they may be any type of agent adapted for preparing an oil-in-water emulsion. They may be desirably selected in accordance with the end use of the polymer solution. If the emulsion is to be broken to recover the non-aqueous phase, then emulsifiers forming quick-breaking emulsions, such as soap solutions, may be used. However, if a stable polymer-water latex is desired then the emulsifiers should be those suitable for forming stable polymer latices, such as, for example, the anionic, cationic and non-ionic emulsifiers and emulsifier combinations disclosed in copending application of Charlet and Small, Serial No. 521, 872, filed July 15, 1955 and incorporated herein by reference. The amount of emulsifier to be used may vary but a desirable amount is enough to leave less than 5.0 wt. percent, based on polymer, in the final solution or latex.

If the polymer-solvent-water system is to be converted to a polymer-water latex it is desirably passed through a suitable homogenizer such as a colloid mill, a dispersator, a Waring Blendor, a sonic mixer or the like with or without the use of additional emulsifying agents. The homogenized emulsion is then stripped to remove the hydrocarbon solvent, leaving the finished latex which is passed to storage.

The polymers which may be emulsified in accordance with the present invention include natural rubber, polyisobutylene, various synthetic rubbers such as butyl rubber (a copolymer of 97% isobutylene and 3% isoprene), GR-S (a copolymer of butadiene and styrene prepared by emulsion polymerization), polybutadiene and copolymers of butadiene and styrene prepared by mass polymerization with sodium, GR-N or Paracril (a copolymer of butadiene and acrylonitrile prepared by emulsion polymerization), and resins such as the copolymers of isobutylene and styrene (prepared at low temperatures with Friedel-Crafts catalysts) and petroleum resins (prepared from steam-cracked petroleum streams, such as naphtha, kerosene or gas oil by the use of Friedel-Crafts catalysts at low temperatures) as well as any other water-insoluble solid polymer.

Suitable solvents which may be emulsified with water and used to dissolve the polymer may be any liquid in which the polymer is soluble, such as for example the hydrocarbon solvents hexane, heptane, octane, isooctane, the nonanes, the decanes, naphtha fractions, benzene, toluene, Varsol, Solvesso 100 (a substantially 100% aromatic hydrocarbon fraction boiling 315–350° F.) and Solvesso 150 (a substantially 100% aromatic hydrocarbon fraction boiling 365–415° F.), cyclohexane, and cyclohexene, carbon tetrachloride, trichloroethylene, carbon disulfide, and the like. More volatile solvents can be used but pressure equipment would be required to minimize evaporation losses.

The water used is preferably distilled or natural soft water but most waters suitable for human consumption can be used. Hard waters may require preliminary chemical treatment to precipitate the polyvalent minerals thereof in the form of stable compounds which will remain inert to the emulsion ingredients if the precipitated compounds are left in the completed emulsion. The amount of water contained in the initial emulsion of hydrocarbon solvent and water is not critical as long as there is enough water present to produce a final stable latex, if such is desired. Thus, the original hydrocarbon-solvent-water emulsion may be composed of from 1 part to 3 parts by weight of hydrocarbon solvent per part of water. After the polymer has been added the final ratio of hydrocarbon solvent to water to polymer may vary over a wide range. However, a suitable ratio has been found to be about 3 parts by weight of hydrocarbon to 2 parts of water to 1 part of polymer. After stripping to remove the hydrocarbon, it is desirable to have as concentrated a latex as possible, particularly for shipping purposes.

In order to make the invention more clearly understood, there is shown in the accompanying drawing one means for carrying the same into practical effect.

Referring now to the drawing, hexane, water and any emulsifiers are introduced through lines 1, 2 and 3, respectively, into the emulsion preparation vessel 4, provided with stirrer 5. The resulting emulsion of hexane in water is withdrawn from vessel 4 through line 6 and introduced into rubber solution vessel 7 provided with stirrer 8. Solid particles of rubber, such as wet crumb is introduced into the pool of hexane-water emulsion in vessel 7 through line 9. Upon agitation with stirrer 8, the rubber goes quickly into solution in the hexane and the resulting hexane-rubber solution immediately forms as the discontinuous phase of the emulsion. When it is desired to prepare a stable latex of polymer in water from this emulsion, it is necessary to reduce the particle size of the discontinuous phase. This can be done by any suitable homogenizer. Accordingly, therefore, the emulsion is withdrawn from vessel 7 through line 10 and introduced into homogenizer 11. This may be a dispersator, a sonic mixer, a colloid mill, a Waring Blendor or the like, or a combination of any of these and may be in one or a plurality of units. From homogenizer 11 the now finely divided dispersion is passed by line 12 into stripper 13 where the hydrocarbon solvent is removed in any suitable manner as by contact with steam or other hot gases. If desired, the water content may be simultaneously reduced to give a final concentrated latex. Hexane and any water are removed overhead through line 14 and condensed in vessel 15 where it is stored and recycled as desired to line 1 through line 16. Finished latex is removed through line 17 and passed to storage.

The further advantages of the invention will be better understood from a consideration of the following experimental data which are given for the sake of illustration, but without intention of limiting the invention thereto.

*Example I*

Equal parts of water and hexane were mixed in accordance with the following recipe:

| | | |
|---|---|---|
| Water | cc | [1] 1500 |
| Hexane | cc | [1] 1500 |
| Oleic acid | grams | 8 |
| KOH | do | 1.6 |
| Triton X-100 [2] | do | 7.5 |
| Polyvinyl alcohol | do | 5.0 |

[1] 900 grams.
[2] A polyoxyethylated octyl phenol containing 8–10 ethylene oxide units.

The mixture was agitated to form an emulsion and while agitating 500 grams of wet butyl rubber crumb (362 grams dry polymer) having a Staudinger mol. wt. of 400,000–420,000 were added and the agitation continued for five hours. The polymer easily dissolved in the dispersed or hexane phase to form a dispersion containing 25 wt. percent solids based on polymer and solvent. When this experiment was repeated using $CCl_4$ instead of hexane, an emulsion containing 9.5 wt. percent solids based on $CCl_4$ plus polymer was formed.

*Example II*

250 grams of dry crumb butyl rubber having a Staudinger mol. wt. of 300,000–330,000 was added to the following agitated mixture:

| | | |
|---|---|---|
| Hexane | cc | [1] 1500 |
| Water | cc | 640 |
| Oleic acid | grams | 8.5 |
| KOH | do | 1.7 |
| Triton X-100 | do | 7.8 |
| Polyvinyl alcohol | do | 6.8 |

[1] 900 grams.

The agitation was continued for five hours and an emulsion containing 10.2% solids based on the total mixture was obtained. A repeat of this example using 500 grams wet instead of dry crumb, the mol. wt. being the same, gave an emulsion containing 11.4% solids based on the total mixture and having a Brookfield viscosity of 194 centipoises. When this same amount of dry crumb butyl rubber (250 grams), same mol. wt., was added directly to 1500 cc. of hexane in the absence of any water and agitated for five hours, a solution containing 19.9 wt. percent solids having a Brookfield viscosity of 1275 centipoises was obtained.

*Example III*

250 grams of a copolymer of 50% isobutylene and 50% styrene was added to the recipe of Example I in the form of dense ¼ inch cubes and agitated for six hours. An emulsion containing 3 wt. percent of solids was obtained representing 27% of polymer dissolved in the hexane.

*Example IV*

Equal quantities (1500 cc. each) of water and hexane were agitated without an emulsifier and while the agitation was continued 250 grams of dry crumb butyl rubber (Staudinger mol. wt. 400,000–420,000) were blended in and the agitation continued for six hours. After the agitation was stopped, the phases quickly separated. The butyl rubber was found to have dissolved in hexane, forming a solution containing 21.7 wt. percent solids.

*Example V*

The experiment of Example I was repeated using ½ in. chunks of GR-S, polyisobutylene, natural rubber and butyl rubber having a molecular weight of about 1,000,000–1,200,000 Staudinger. In each case the polymer dissolved in the dispersed phase. The GR-S formed a dispersion containing 17.2 wt. percent solids based on the polymer and hexane; the polyisobutylene dispersion contained 10.4 wt. percent solids; the natural rubber dispersion 13.3 wt. percent solids, and the high molecular weight butyl rubber 13.8 wt. percent solids.

*Example VI*

To a high-shear type of agitator known as the "Dispersator" and manufactured by Premier Mills Co., there was added the following materials in the order listed:

| | | |
|---|---|---|
| Water | gallons | 8.4 |
| Triton X-100 | grams | 436 |
| Polyvinyl alcohol | do | 304 |
| KOH | do | 91 |
| Oleic acid | do | 456 |
| Hexane | gallons | 14 |
| Wet butyl rubber crumb | lbs | [1] 59 |

[1] 29.5 lbs. rubber, 29.5 lbs. water.

The above mixture was agitated for three hours and samples were taken at half-hour intervals with following results:

| Mixing time | Polymer dispersed, wt. percent |
|---|---|
| 0.5 | 2.1 |
| 1.0 | 7.3 |
| 1.5 | [1] 15.5 |
| 2.0 | 15.5 |
| 2.5 | 15.5 |
| 3.0 | 15.5 |

[1] Equivalent to all polymer added.

Each sample was allowed to stand for 60 hours to test stability of the emulsion. The following results were obtained:

| Time of sampling | 0.5 | 1 | 1.5 | 2 | 2.5 |
|---|---|---|---|---|---|
| Total vol. of sample | 59 | 66 | 62 | 62 | 57 |
| Vol. coagulation | 2 | 7.5 | 1.5 | 2 | 1.5 |
| Vol. whey | 23.5 | 25 | 9 | 3 | 1.5 |
| Percent whey | 39.8 | 37.9 | 14.5 | 4.8 | 2.6 |

A portion of the final sample was stripped in the laboratory in glass equipment and a stable latex was recovered.

The above examples clearly show that any type of polymer may be dissolved in a solvent for the rubber even though the solvent is dispersed in water. As Example II shows, the predispersion of the solvent in water reduces the viscosity considerably, from 1275 centipoises to 194 centipoises, in the particular instance. As Example IV shows, it is not necessary to use an emulsifier with the mixture of solvent and water, it is only necessary to use constant agitation. As Example VI shows, the emulsion is very stable and can be stored for a reasonable period of time with little change in physical properties. It can also be stripped to form a stable latex.

The nature of the present invention having been thus fully set forth and specific examples of the same given, what is claimed as new and useful and desired to be secured by Letters Patent is:

1. A method which comprises providing a wet solid rubbery copolymer of butyl rubber containing between about 27 and 50% by weight of water therein; forming a violently agitated mixture of 1 to 3 parts of hexane dispersed in 1 part of water as the continuous phase; and adding said wet rubbery copolymer directly to said agitated mixture to provide a solution of rubbery polymer in said hexane, with a relatively low viscosity.

2. A method which comprises providing a wet solid rubbery copolymer of 97% isobutylene with 3% isoprene containing between about 27 and 50% by weight of water therein; forming a violently agitated emulsion of 1 to 3 parts of hexane dispersed in 1 part of water as the continuous phase; adding said wet rubbery copolymer directly to said agitated emulsion to provide a solution of rubbery polymer dissolved in said hexane with a relatively low viscosity, said solution being dispersed in water; and stripping the solvent from the dispersion to provide an aqueous latex with fine polymer particles therein.

3. A method which comprises providing a wet solid rubbery copolymer of 97% isobutylene with 3% isoprene containing about 27% by weight of water therein; forming a violently agitated mixture of 1 to 3 parts of hexane dispersed in 1 part of water as the continuous phase; and adding said wet rubbery copolymer directly to said agitated mixture to provide a solution of rubbery polymer in said hexane, with a relatively low viscosity.

4. A method which comprises providing a wet solid rubbery copolymer of 97% isobutylene with 3% isoprene containing 50% by weight of water therein; forming a violently agitated mixture of 1 to 3 parts of hexane dispersed in 1 part of water as the continuous phase; and adding said wet rubbery copolymer directly to said agitated mixture to provide a solution of rubbery polymer in said hexane, with a relatively low viscosity.

References Cited in the file of this patent

UNITED STATES PATENTS

| 1,909,080 | Strauch | May 16, 1933 |
| 2,296,427 | Daniel et al. | Sept. 22, 1942 |
| 2,313,144 | Gomm | Mar. 9, 1943 |
| 2,595,797 | Leonmark | May 6, 1952 |
| 2,799,662 | Ernst et al. | July 16, 1957 |

FOREIGN PATENTS

| 515,763 | Great Britain | Dec. 13, 1939 |
| 363,681 | Great Britain | June 19, 1930 |

OTHER REFERENCES

Hackh's Chemical Dictionary (2nd edition) (1937), pages 596, 677.